(12) United States Patent
Ratner

(10) Patent No.: US 9,242,712 B1
(45) Date of Patent: Jan. 26, 2016

(54) TENDON MOUNTING SYSTEM

(71) Applicant: Google Inc., Mountain View, CA (US)

(72) Inventor: Daniel Ratner, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/540,571

(22) Filed: Nov. 13, 2014

(51) Int. Cl.
 *B64B 1/40* (2006.01)
 *B64B 1/62* (2006.01)

(52) U.S. Cl.
 CPC .......................................... *B64B 1/62* (2013.01)

(58) Field of Classification Search
 USPC .......................... 244/31, 33, 125, 126; 114/54
 See application file for complete search history.

(56) References Cited

U.S. PATENT DOCUMENTS

| | | | | |
|---|---|---|---|---|
| 2,679,224 A * | 5/1954 | Sturtevant | ................. | B63C 7/06 114/54 |
| 2,919,082 A * | 12/1959 | Winzen | ..................... | B64B 1/58 24/462 |
| 4,365,772 A | 12/1982 | Ferguson | | |
| 5,813,627 A | 9/1998 | Huntington | | |
| 6,394,388 B2 * | 5/2002 | Casteras | ................... | B64B 1/58 244/1 R |
| 8,186,625 B2 | 5/2012 | De Jong | | |
| 9,004,398 B2 * | 4/2015 | Walter | ...................... | B64B 1/62 244/31 |
| 9,027,874 B1 * | 5/2015 | Roach | ...................... | B64B 1/40 244/31 |
| 2005/0224639 A1 * | 10/2005 | Kavanagh | ................. | B64B 1/64 244/31 |
| 2014/0158823 A1 | 6/2014 | Smith et al. | | |

* cited by examiner

*Primary Examiner* — Christopher P Ellis
(74) *Attorney, Agent, or Firm* — Lerner, David, Littenberg, Krumholz & Mentlik, LLP

(57) ABSTRACT

A system for use with a balloon having a balloon envelope is provided. The system includes a tendon assembly for mounting tendons to the balloon envelope. This tendon assembly includes a plate structure having a fill port attached to an apex of the balloon envelope and a plurality of tendons arranged over the plate structure. The fill port is configured to allow lift gas to pass into balloon envelope. Each tendon of the plurality of tendons has a first portion, a second portion, and a middle portion disposed between the first portion and the second portion. The first portion of a given tendon is arranged to engage a first section of the plate structure. The second portion is arranged to engage a second section of the plate structure opposite of the first section. The middle portion is arranged to wrap around the fill port of the plate.

20 Claims, 7 Drawing Sheets

First Contact Point

Second Contact Point

TENDON MOUNTING SYSTEM

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. As such, the balloons include a flexible envelope made of material that may be configured in sections or lobes to create a "pumpkin" or lobed balloon. These lobes are supported by a plurality of tendons.

The tendons are used to help maintain the shape and carry the load of the pressurized envelope so that the envelope material does not bear as much while the balloon is in flight. In some situations, a heavy metal load ring or rod can be attached to the tendons to support the anticipated tendon load caused by inflating the balloon envelope. For example, the metal load ring may be fastened to the tendons through pre-fixed cut outs in an apparatus, which may be used to transfer the load of one tendon to its opposite on the other side of the apex through hoop stress in the load ring.

BRIEF SUMMARY

Aspects of the present disclosure are advantageous for providing a system for mounting tendons to a high-altitude balloon. In one aspect, the system may include a balloon having a balloon envelope and a tendon assembly for mounting tendons to the balloon envelope. The tendon assembly may include a plate structure having a fill port attached to an apex of the balloon envelope and a plurality of tendons arranged over the plate structure. The fill port may be configured to allow lift gas to pass into balloon envelope. Each tendon of the plurality of tendons has a first portion, a second portion, and a middle portion disposed between the first portion and the second portion. The first portion of a given tendon is arranged to engage a first section of the plate structure. The second portion is arranged to engage a second section of the plate structure opposite of the first section. The middle portion is arranged to wrap around the fill port of the plate structure.

In one example, the tendon may include webbing and the middle portion may include a split in the webbing to allow a portion of the fill port to pass through the webbing. In this regard, the fill port may be configured so that the middle portion of one or more given tendons from the plurality of tendons can be stacked up at the apex of the balloon envelope.

In another example, the first and second portions of a given tendon from the plurality of tendons may be arranged along a circumference of the plate structure. This plate structure can be arranged at a central portion of the apex of the balloon envelope and the fill port can be arranged at a center section of the plate structure.

In yet another example, a restraining device can be attached to the fill port. The restraining device may be used to secure the middle portion of a given tendon of the plurality of tendons to the apex of the balloon envelope. In this regard, the restraining device may include at least one of a clip, nut, pin or O-ring fastener. In some examples, the fill port may include a plurality of threads being configured to receive the restraining device.

In another aspect, an assembly for use with a balloon envelope is provided. The assembly may include a plate structure having a fill port attached to an apex of the balloon envelope and a plurality of tendons arranged over the plate structure. The fill port may be configured to allow lift gas to pass into balloon envelope. Each tendon of the plurality of tendons has a first portion, a second portion, and a middle portion disposed between the first portion and the second portion. The first portion of a given tendon is arranged to engage a first section of the plate structure. The second portion is arranged to engage a second section of the plate structure opposite of the first section. The middle portion is arranged to wrap around the fill port of the plate structure.

DETAILED DESCRIPTION

The present disclosure generally relates to providing lightweight and low-cost techniques for efficiently mounting tendons to a high-altitude balloon. One aspect of the present technology provides a system that includes a balloon having a balloon envelope with a plate structure. This plate structure may be used to mount the tendons to the balloon envelope during assembly of the balloon and may also facilitate filling of the envelope with lift gas.

The plate structure may be attached or positioned on top or at an apex of the balloon envelope. This plate structure may include a fill port that allows lift gas to pass into balloon envelope, for example, when filling the balloon. In some examples, this fill port may be arranged substantially near a center section of the plate structure. Example plate assemblies may have a cylindrical shape and may be made of a lightweight yet rigid material, such as a type of plastic or metal.

After the plate structure has been positioned at the apex, a plurality of tendons may be arranged over the plate. Each tendon may include first and second portions with a middle portion in between. For example, the tendons may serve as a load line for supporting the balloon envelope and may be positioned at two places on the plate structure that are 180 degrees apart. In that regard, the first portion of a given tendon may be arranged to engage a first section of the plate structure and a second portion of the given tendon may be looped over the plate structure and arranged to engage a second section of the plate structure substantially opposite the first section.

To more evenly distribute stresses on the plate structure caused by the tendons, a middle portion of each tendon may be arranged to wrap around the fill port of the plate structure. For example, a given middle portion may include a split or opening that is configured to receive a portion of the fill port. In this example, the given middle portion may be placed over the fill port and positioned so that the port passes through the split in the tendon.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents.

EXAMPLE SYSTEM

Figure 1:
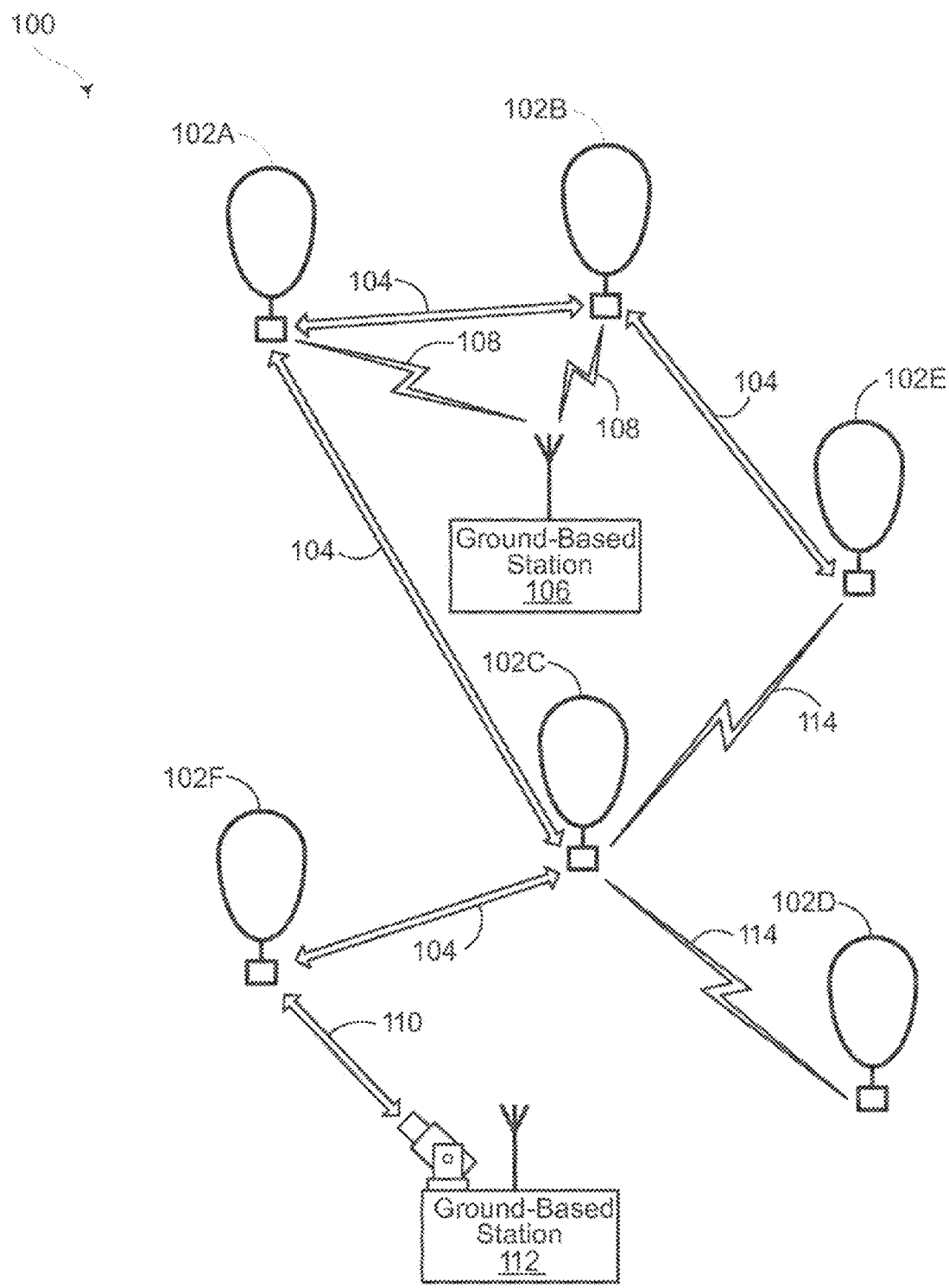
FIG. 1 is a functional diagram of a system in accordance with aspects of the present disclosure.

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." the system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

EXAMPLE BALLOON

Figure 2:
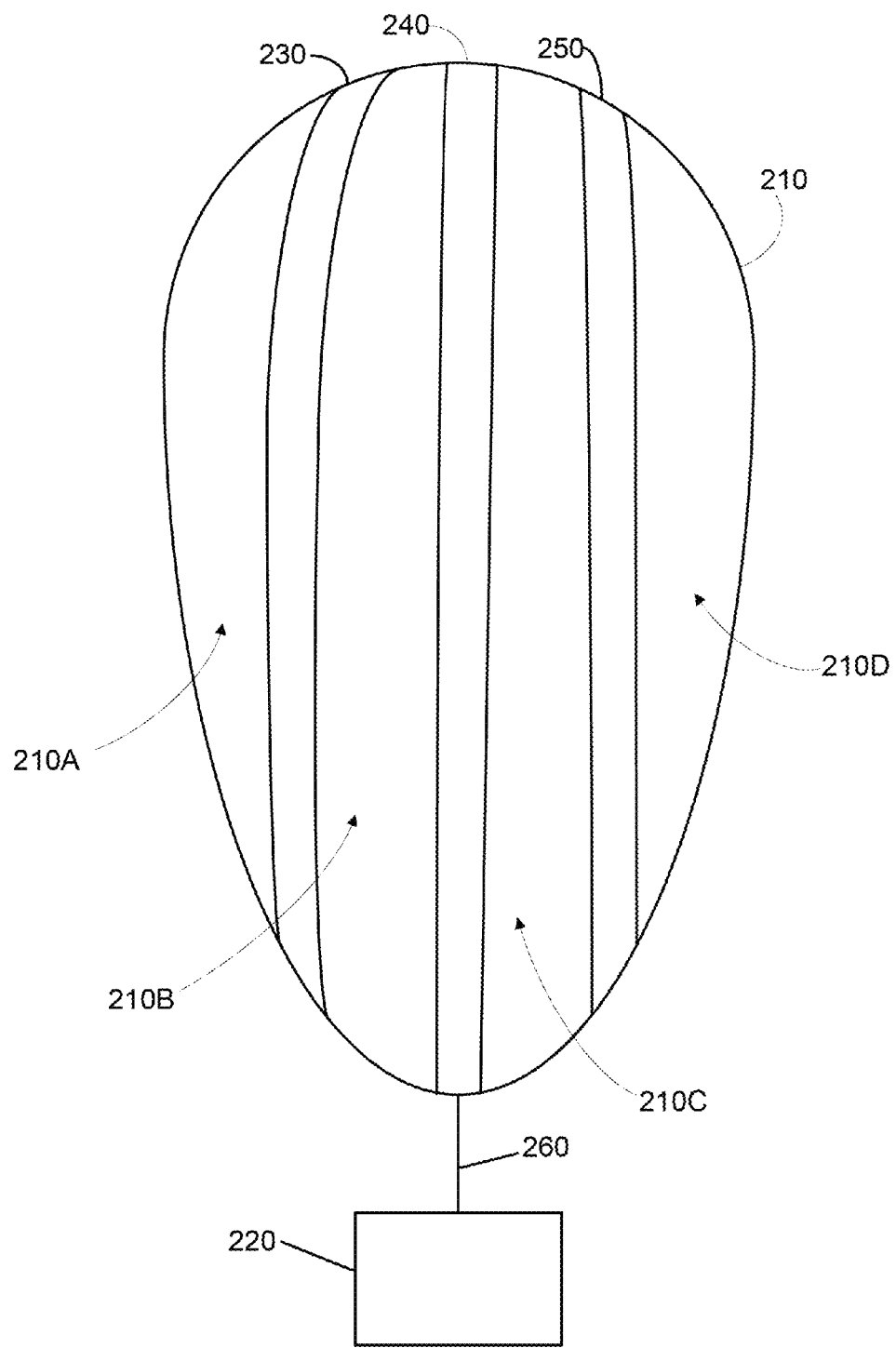
FIG. 2 is an illustration of a balloon in accordance with aspects of the present disclosure.

FIG. 2 is an example balloon 200, which may represent any of the balloons of balloon network 100. As shown, the balloon 200 includes an envelope 210, a payload 220 and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 may be affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D.

Pressurized lift gas within the balloon envelope 210 may cause a force or load to be applied to the balloon 200. In that regard, the tendons 230-250 provide strength to the balloon 200 to carry the load created by the pressurized gas within the balloon envelope 210. In some examples, a cage of tendons (not shown) may be created using multiple tendons that are attached vertically and horizontally.

Each tendon may be adhered to a respective envelope gore. Alternately, a tubular sleeve may be adhered to the respective envelopes with the tendon positioned within the tubular sleeve. In some examples, the tendons 230-250 may be run from the apex to the bottom of the balloon envelope 210 in order to pick up the load. In normal operations, these tendons 230-250 need to be kept in place during balloon flight in order to continue to handle the load and maintain the shape of the balloon envelope. Top ends of the tendons 230, 240 and 250 may be coupled together using a type of apparatus or top cap (not shown) positioned at the apex of balloon envelope 210.

EXAMPLE MOUNTING SYSTEM

Figure 3:
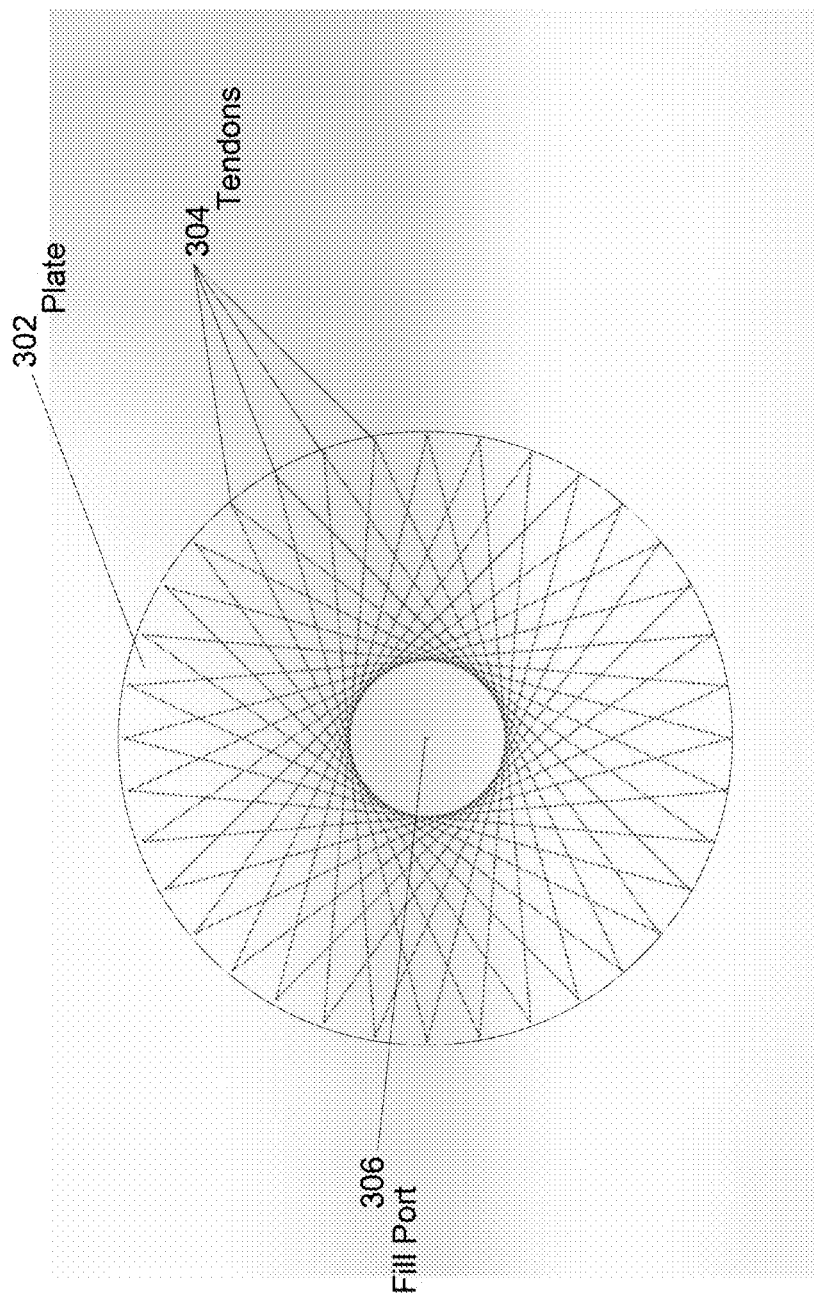
FIG. 3 is top view of an example of a mounting system in accordance with aspects of the present disclosure.

As noted above, one aspect of the present technology provides a mounting system for securing tendons, such as tendons 230, 240 and 250 to the balloon envelope 210. In FIG. 3, a top view of an example of a mounting system 300 is shown. In this example, the mounting system 300 may include a plate 302 or another type of structure and a plurality of tendons 304 arranged over the plate 302. The plurality of tendons 304 may be compared to tendons 230, 240, and 250.

In some embodiments, the plate 302 may be arranged at a central portion on top of the balloon envelope 210. In other embodiments, the plate 302 may be an integral part of the balloon envelope. For example, the plate 302 may be attached to the balloon during manufacture of the balloon envelope 210. The plate 302 may be circular or preconfigured in various other shapes. This plate 302 can be constructed from several types of lightweight yet rigid materials, such as plastics, PVC, metals and etc.

In some embodiments, the plate 302 may have a thickness sufficient enough to support the plurality of tendons 304. For example, in one embodiment, the plate 302 may have a predetermined thickness of suitable material that can support the plurality of tendons 304 without substantially losing shape. In some examples, the thickness of the plate 302 may be uniformly distributed along all areas of its surface. Alternatively, the plate 302 may have a different thickness in certain portions. For example, reinforcements, such as extra plate material, may be added to portions of the plate 302 to increase the thickness of the plate 302 in that area. The reinforcements may be used to add extra strength to those areas of the plate 310 so that the plate can better maintain its shape when forces are applied due to a weight of the lift gas load carried by the plurality of tendons 304.

In some aspects, the plate 302 may include a fill port 306. This fill port 306 can be used to fill the balloon envelope 210 with lift gas. For example, the fill port 306 can be coupled to a lift gas fill source (not shown), which can be used to inflate the balloon.

The fill port 306 may be arranged at a center section of the plate 302. In some examples, the fill port 306 may project vertically from a surface of the plate 302. In doing so, this may allow the fill port 306 to be arranged so as to assist in stacking up a portion of the plurality of tendons 304 at the center portion of the plate 302. For example, the plurality of tendons 304 may be arranged such that a section of each tendon wraps around the fill port 306.

Each tendon of the plurality of tendons 304 may be comprised of webbing. This webbing may include a plurality of fibers (not shown) woven together in a certain configuration. Alternatively, the plurality of tendons 304 do not have to be comprised of webbing, and instead, may be formed from other types of non-woven fibers.

As shown in FIG. 3, the plurality of tendons 304 are arranged to cross over sections of the plate 302. In some aspects, the plurality of tendons 304 may be formed into a particular shape so that they can be easily arranged or otherwise looped over the plate 302. One example of a tendon is discussed in greater detail below with reference to FIG. 4.

Figure 4:
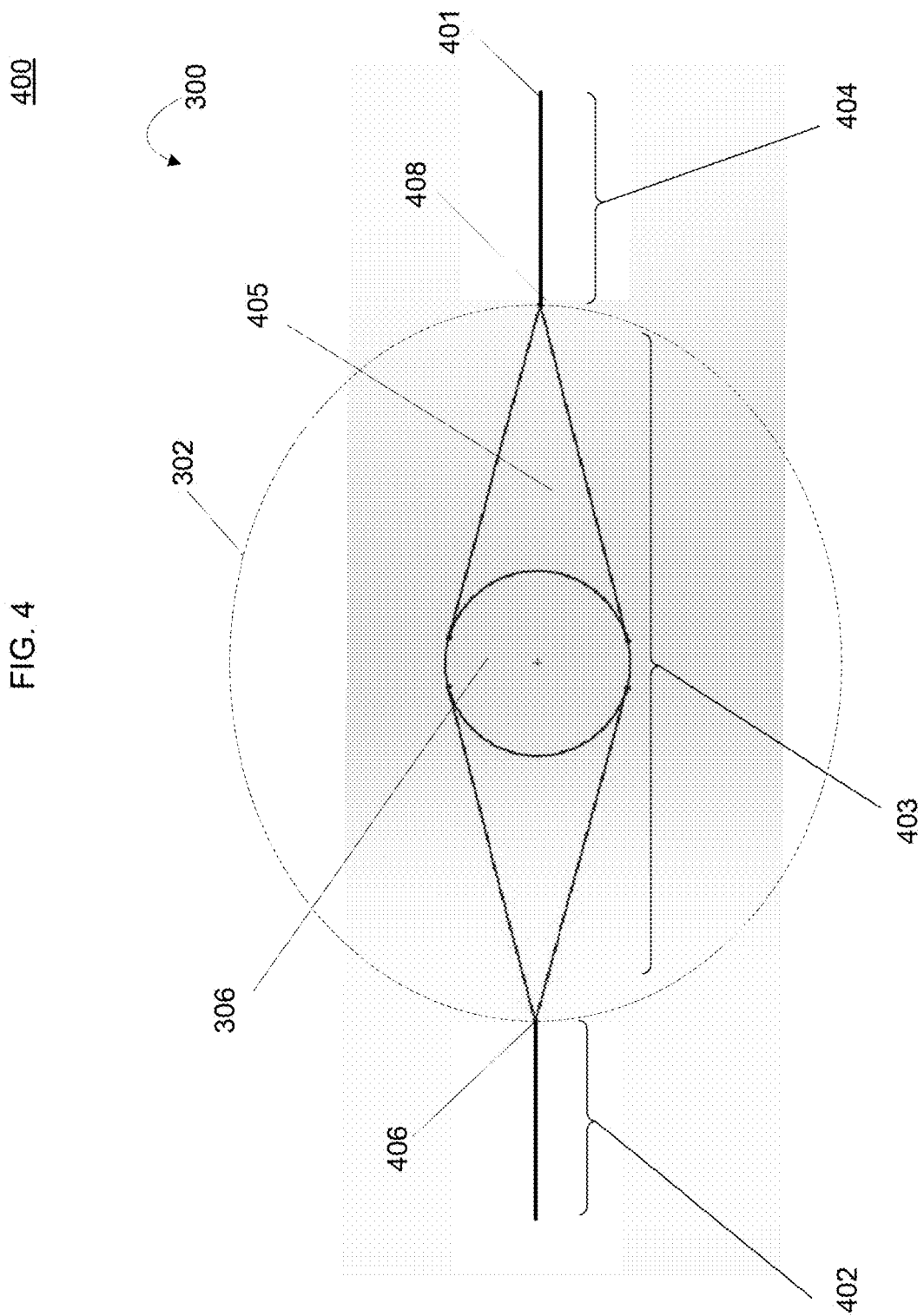
FIG. 4 is another example top view of the mounting system of FIG. 3.

FIG. 4 is another example top view 400 of the mounting system 300 of FIG. 3. In this example, the system 300 is shown with only one tendon 401 which can be any tendon of the plurality of tendons 304 discussed above. As shown, the tendon 401 may include a first portion 402, a second portion 404, and a middle portion 403 disposed between the first portion 402 and the second portion 404.

Each of the portions of tendon 401 may be of a certain length. For example, the first and second portions 402 and 404 of tendon 401 may be of a sufficient length to extend along an axis of the balloon. The middle portion 403 of the tendon 401 may be of a sufficient length to extend across a length of plate 302. In some embodiments, the combined length of these portions may be such that the tendon 401 can also accommodate a bulge in the envelope caused by the load of lift gas being carried therein.

To arrange the tendon 401 over plate 302, each portion of the tendon 401 may be configured to engage a different section of the plate 302. For example, the first portion 402 of tendon 401 may engage the plate 302 at a first contact point 406, and the second portion 404 may be arranged to engage a second contact point 408 on the plate 302 that is substantially opposite of the first contact point 406. An advantage of arranging the tendon 401 to make at least two contacts with the plate 302 is that fewer tendons may be needed to prepare the balloon envelope for deployment. In addition, by using fewer tendons, the balloon may be more rapidly assembled.

As shown in FIG. 4, the contact points 406 and 408 may be arranged along a circumference of the plate 302. This may help distribute the load forces cause by the tendon 401 more uniformly around the plate 302. In some embodiments, each contact point may include one or more clips (not shown) that may hold the first and/or second section of a given tendon onto the plate 302. An advantage of the clips is that they may help prevent some amount of slippage off of the plate 302 by the tendons. The clips may also help keep the tendons spaced apart by a uniform distance.

In some embodiments, the middle portion 403 may make contact with the plate 302 at a center section. For example, the middle portion 403 may be arranged to wrap around the fill port 306 of the plate 302. In this regard, the middle portion may include a split 405 in the tendons fibers or any other type of preconfigured separation or opening in the tendon 401. This split 405 may be configured to allow a portion of the fill port 306 to pass through. For example, the split 405 may be sized so that a portion of the fill port 306 projecting vertically from the surface of the plate 302 can fit therein.

Figure 5A:
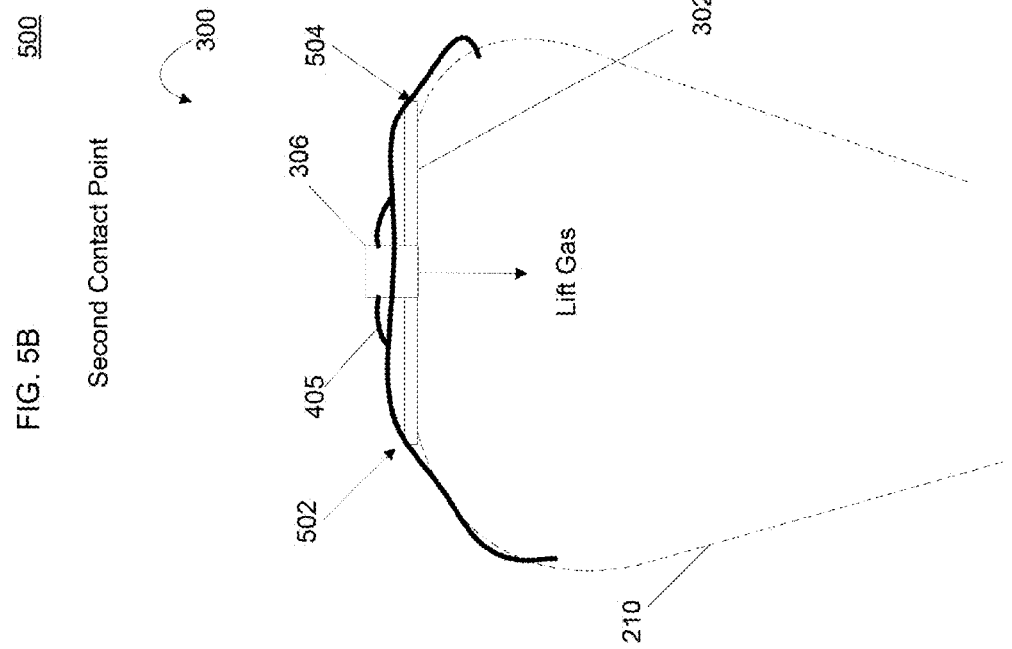
FIGS. 5A-5B are side views of the mounting system of FIG. 3 in accordance with aspects of the present disclosure.
Figure 5B:
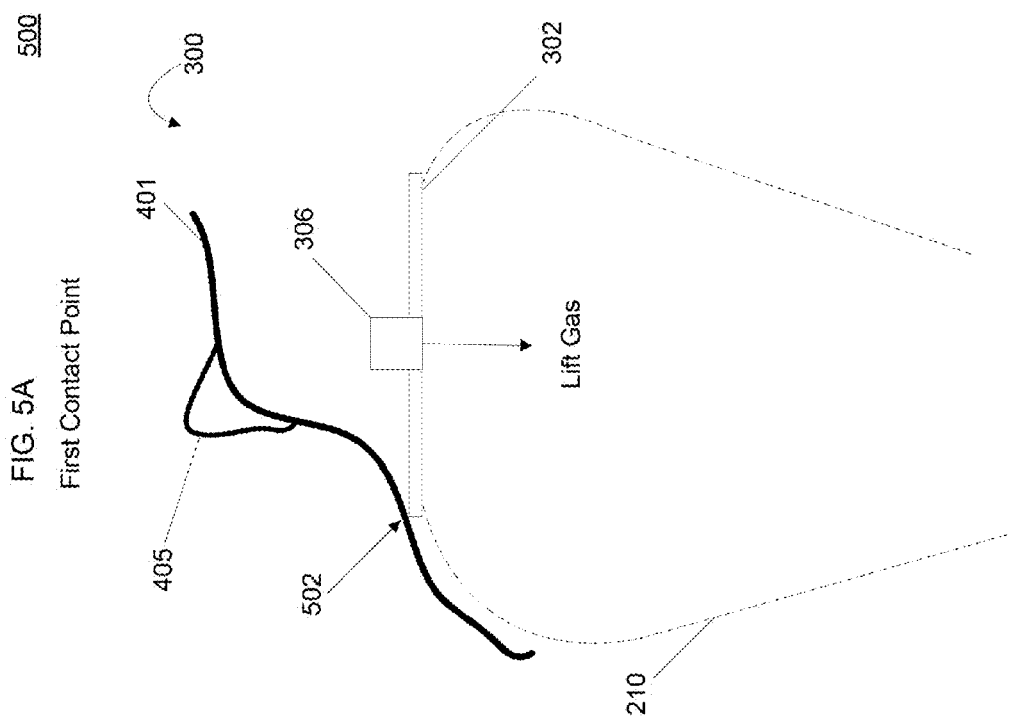

FIGS. 5A and 5B are example side views 500 of the mounting system 300 of FIG. 3. In this example, steps for placing a given tendon, such as tendon 401, on balloon envelope 210 are depicted. As shown in FIG. 5A, when tendon 401 is first placed at the plate 302, the tendon 401 may engage the plate 302 at a first contact point 502, which may correspond to the first contact point 406 in FIG. 4. Thereupon, the split 405 in the tendon 401 may be placed over fill port 306. For example, the fill port 306 may be inserted through the split 405 so that a middle section of the middle portion 403 of the tendon 401 may rest on the plate 302.

With regards to FIG. 5B, the split 405 is shown wrapped around the fill port 306. At this point, the tendon 401 may engage a second contact point 502 on the plate 302, which may correspond to the second contact point 408 in FIG. 4, which is substantially opposite to the first contact point 504. The steps of FIGS. 5A and 5B for placing a given tendon on the balloon envelope 210 may be repeated over and over again with additional tendons like tendon 401, until a sufficient number of tendons, such as eighteen or more or less tendons, have been arranged over the plate 302 in order to complete assembly of tendons onto the balloon.

Figure 6B:
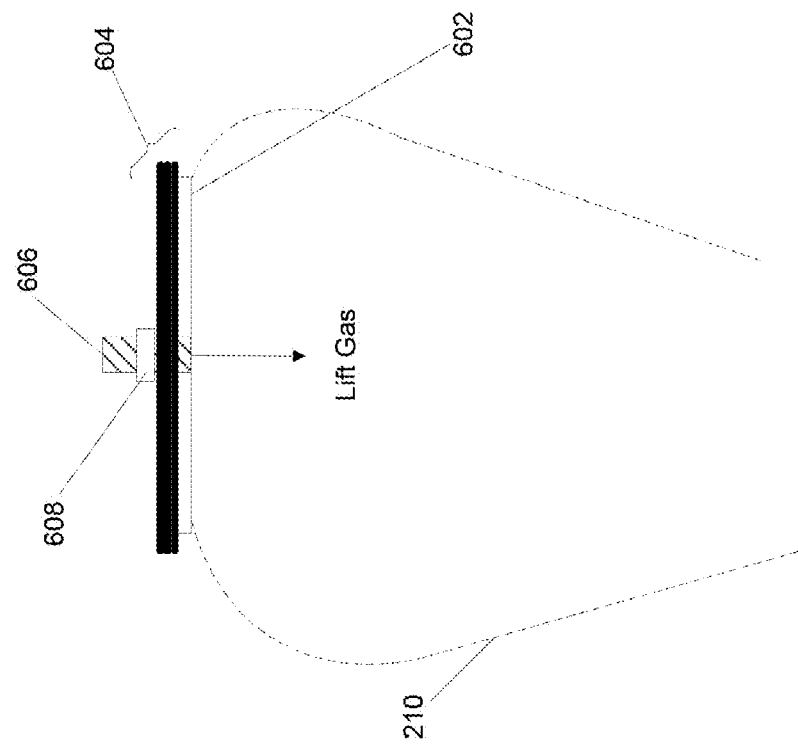
FIGS. 6A-6B are side views of another example of a mounting system in accordance with aspects of the present disclosure.
Figure 6A:
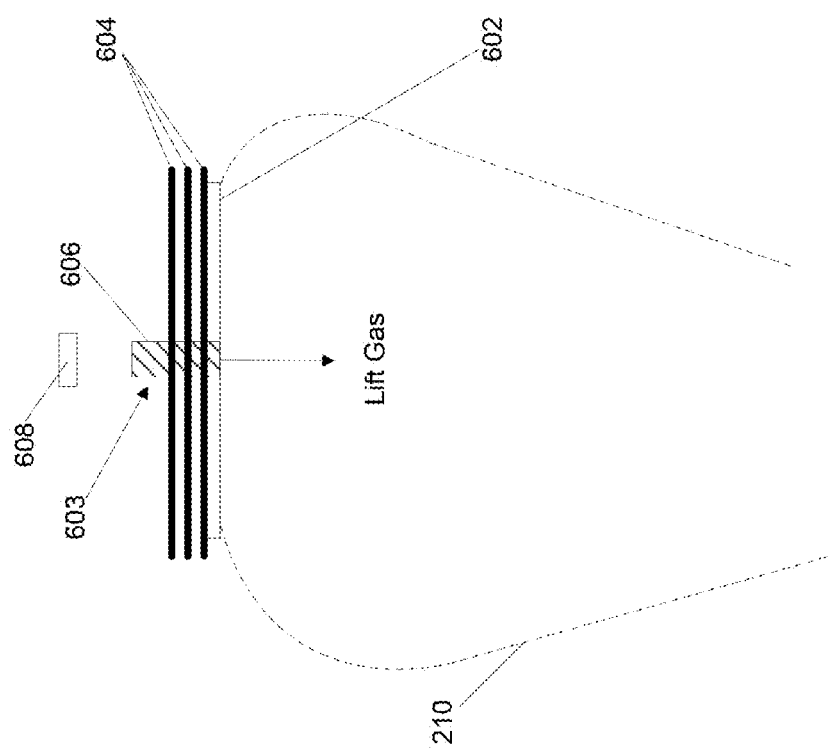

FIGS. 6A-6B are side views of another example of a mounting system 600. Mounting system 600 may be compared to mounting system 300 of FIG. 3 discussed above. For example, mounting system 600 includes a plate 602 (which may be compared to plate 302) having a fill port 606 (which may be compared to fill port 306) that is attached to balloon envelope 210 and a plurality of tendons 604 (which may be compared to tendons 304 and 401) arranged over the plate 602.

As shown in the example of FIG. 6A, the fill port 606 includes a plurality of threads 603. The threads 603 may be configured to receive a restraining device 608 which may be used to secure the middle portion of a given tendon of the plurality of tendons 604 to the plate 602. As discussed above, a middle portion of each tendon of the plurality tendons 604 can be stacked up at the fill port 606 located at an apex of the balloon envelope 210. In some examples, the restraining device 608 may include one or more various different types of clips, nuts, pins, 0-ring fasteners or other types of hardware devices that can be attached to the fill port 606.

Turning to the example of FIG. 6B, the restraining device 608 is shown attached to fill port 606. For example, the restraining device 608 may be placed around a top of the fill port 606 and brought gradually closer to plate 602 by moving the device 608 along the threads 603 of fill port 606. As the restraining device 608 is moved closer to the plate 602, the tendons 604 may be moved closer together, thereby tightly securing them in place. Once the mounting system 600 is secured to the balloon envelope 210, the envelope and balloon may be inflated and completed.

While the examples above discuss arranging components on balloon envelope 210 in a particular order, other modifications are possible while still maintaining functionality of the mounting system as described above. For example, in one alternative for arranging the components of mounting system 600, the tendons 604 may be installed onto the balloon envelope 210 at the time when gores of the envelope 210 are being seamed together, such as during envelope fabrication. Thereafter, the fill port 606 and plate 602 may be adhered to the balloon envelope 210 and the tendons 604 placed over the fill port 606. Then, the restraining device 608 may be placed on top of the tendons 604 to hold them down. In another alternative for arranging the components of mounting system 600, the fill port 606 and plate 602 may be attached to balloon envelope 210 and the envelope 210 may be lifted and partially filled. Then, the tendons 604 may be attached to balloon envelope 210 and the restraining device 608 may be installed to hold the tendons 604 down. Still further, other sequences for arranging components of the mounting system 600 are possible in order to complete assembly of the balloon.

Figure 7:
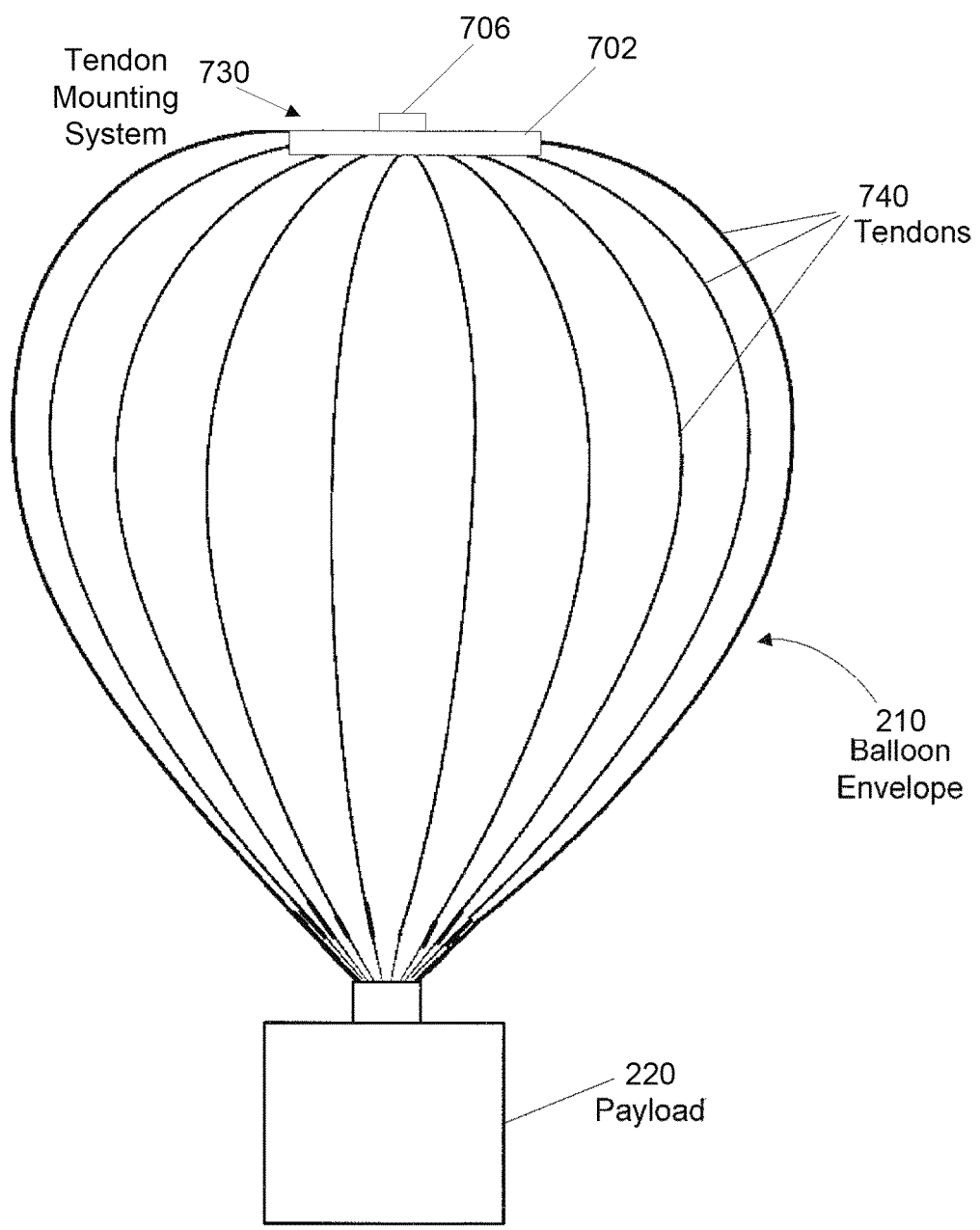
FIG. 7 is an illustration of another example of a balloon in accordance with aspects of the present disclosure.

FIG. 7 is another example of a balloon 700, which includes a mounting system 730 that may be compared to mounting systems 300 of FIGS. 3 and 600 of FIGS. 6A-6B. For example, mounting system 730 includes a plate 702 (which may be compared to plates 302 and 602) having a fill port 706 (which may be compared to fill ports 306 and 606) attached to an apex of balloon 700 and a plurality of tendons 740 (which may be compared to tendons 304, 401 and 604) arranged over the plate 702.

As discussed above, the mounting system 730 may serve as a mounting point for securing the plurality of tendons 740 to balloon envelope 210. In this example, after the tendons 740 have been arranged over the plate 702, balloon envelope 210 may be then filled with lift gas for deployment. For example, in FIG. 7, the balloon envelope 210 is shown filled with lift gas. Then, payload 220 may be attached, and thereafter, the balloon 700 may be released into the air.

The above-described aspects of the present disclosure may be advantageous for improving the efficiency of assembling balloons. For example, by positioning each tendon to make at least two contacts with a plate resting at an apex of the envelope, less tendons may be needed to secure to the balloon envelope for deployment. Moreover, by routing the tendons across the plate, it may be possible to reduce the size and thickness of the mounting system for the tendons. This may allow the tendons to be configured to support a load carried by the balloon envelope without having to couple a heavy support system for these tendons to the balloon.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
   a balloon having a balloon envelope; and
   a tendon assembly for mounting tendons to the balloon envelope, the tendon assembly comprising:
      a plate structure having a fill port attached to an apex of the balloon envelope, the fill port being configured to allow lift gas to pass into balloon envelope; and
      a plurality of tendons arranged over the plate structure, each tendon of the plurality of tendons having a first portion, a second portion, and a middle portion disposed between the first portion and the second portion, wherein the first portion of a given tendon is arranged to engage a first section of the plate structure and the second portion of the given tendon is arranged to engage a second section of the plate structure opposite of the first section and the middle portion is arranged to wrap around the fill port of the plate structure.

2. The system of claim 1, wherein the tendon includes webbing.

3. The system of claim 2, wherein the middle portion includes a split in the webbing to allow a portion of the fill port to pass through the webbing.

4. The system of claim 3, wherein the fill port is configured so that the middle portion of one or more given tendons from the plurality of tendons can be stacked up at the apex of the balloon envelope.

5. The system of claim 1, wherein the first and second portions of a given tendon from the plurality of tendons are arranged along a circumference of the plate structure.

6. The system of claim 5, wherein the plate structure is arranged at a central portion of the apex of the balloon envelope.

7. The system of claim 6, wherein the fill port is arranged at a center section of the plate structure.

8. The system of claim 1, further comprising a restraining device attached to the fill port, the restraining device is configured to secure the middle portion of a given tendon of the plurality of tendons to the apex of the balloon envelope.

9. The system of claim 8, wherein the restraining device includes at least one of a clip, nut, pin or O-ring fastener.

10. The system of claim 8, wherein the fill port includes a plurality of threads being configured to receive the restraining device.

11. An assembly comprising:
   a plate structure having a fill port attached to an apex of a balloon envelope, the fill port being configured to allow lift gas to pass into balloon envelope; and
   a plurality of tendons arranged over the plate structure, each tendon of the plurality of tendons having a first portion, a second portion, and a middle portion disposed between the first portion and the second portion, wherein the first portion of a given tendon is arranged to engage a first section of the plate structure and the second portion of the given tendon is arranged to engage a second section of the plate structure opposite of the first section and the middle portion is arranged to wrap around the fill port of the plate structure.

12. The assembly of claim 11, wherein the tendon includes webbing.

13. The assembly of claim 11, wherein the middle portion includes a split in the webbing to allow a portion of the fill port to pass through the webbing.

14. The assembly of claim 13, wherein the fill port is configured so that the middle portion of one or more given tendons from the plurality of tendons can be stacked up at the apex of the balloon envelope.

15. The assembly of claim 11, wherein the first and second portions of a given tendon from the plurality of tendons are arranged along a circumference of the plate structure.

16. The assembly of claim 15, wherein the plate structure is arranged at a central portion of the apex of the balloon envelope.

17. The assembly of claim 16, wherein the fill port is arranged at a center section of the plate structure.

18. The assembly of claim 11, further comprising a restraining device attached to the fill port, the restraining device is configured to secure the middle portion of a given tendon of the plurality of tendons to the apex of the balloon envelope.

19. The assembly of claim 18, wherein the restraining device includes at least one of a clip, nut, pin or O-ring fastener.

20. The assembly of claim 18, wherein the fill port includes a plurality of threads being configured to receive the restraining device.

* * * * *